United States Patent
Olden et al.

(10) Patent No.: US 8,667,776 B2
(45) Date of Patent: *Mar. 11, 2014

(54) PELLET-LOADED MULTIPLE IMPULSE ROCKET MOTOR

(75) Inventors: Thomas A. Olden, Tucson, AZ (US); Robert J. Cavalleri, Coral Springs, FL (US)

(73) Assignee: Raytheon Company, Waltham, MA (US)

( * ) Notice: Subject to any disclaimer, the term of this patent is extended or adjusted under 35 U.S.C. 154(b) by 1031 days.

This patent is subject to a terminal disclaimer.

(21) Appl. No.: 12/391,216

(22) Filed: Feb. 23, 2009
(Under 37 CFR 1.47)

(65) Prior Publication Data
US 2012/0036831 A1  Feb. 16, 2012

(51) Int. Cl.
*F02K 9/28* (2006.01)
*F02K 9/00* (2006.01)

(52) U.S. Cl.
USPC ............ 60/250; 60/253; 60/254; 60/256

(58) Field of Classification Search
USPC ............. 60/228, 229, 250, 253, 254, 256
See application file for complete search history.

(56) References Cited

U.S. PATENT DOCUMENTS

| 3,023,570 A | 3/1962 | Crouch |
| 3,093,964 A | 6/1963 | Hausmann |
| 3,122,884 A * | 3/1964 | Grover et al. ............ 60/252 |
| 3,226,928 A | 1/1966 | Webb et al. |
| 3,248,875 A | 5/1966 | Wolcott |
| 3,316,718 A | 5/1967 | Webb |
| 3,385,063 A | 5/1968 | Brown, Jr. |
| 3,393,517 A | 7/1968 | Altman et al. |
| 3,397,539 A | 8/1968 | Schubert |
| 3,442,084 A | 5/1969 | Dilchert et al. |
| 3,527,168 A | 9/1970 | McCurdy et al. |
| 3,555,825 A | 1/1971 | Dilchert |
| 3,581,662 A | 6/1971 | Grebert |
| 3,584,461 A | 6/1971 | Debize et al. |
| 3,595,025 A | 7/1971 | Stockel et al. |

(Continued)

FOREIGN PATENT DOCUMENTS

WO  2008-048702 A2  4/2008

OTHER PUBLICATIONS

SNECMA Propulsion Solide, SAFRAN Group, Recent solid DACS achievements for high performance interceptors, 3rd AAAF International Conference on Missle. Difense-7, Jun. 9, 2006, Seville.

*Primary Examiner* — Ehud Gartenberg
*Assistant Examiner* — Arun Goyal
(74) *Attorney, Agent, or Firm* — Renner, Otto, Boisselle & Sklar, LLP (57) ABSTRACT

There is disclosed an apparatus which may include a common nozzle and a plurality of combustion chambers coupled to the nozzle. Each of the plurality of combustion chambers may include a case, a solid fuel propellant charge in the form of a plurality of fuel pellets, and an igniter disposed to ignite the propellant charge. Each of the plurality of combustion chambers may also include a pellet retainer disposed to retain unignited fuel pellets within the case and a burst disk disposed between the propellant charge and the nozzle. Each burst disk may adapted to rupture when the associated propellant charge is ignited and to not rupture when a propellant charge of any of the other combustion chambers is ignited.

26 Claims, 6 Drawing Sheets

(56) References Cited

U.S. PATENT DOCUMENTS

| | | | |
|---|---|---|---|
| 3,698,183 A | 10/1972 | MacDonald et al. | |
| 3,908,364 A * | 9/1975 | LeFebvre et al. | 60/252 |
| 3,992,877 A | 11/1976 | Granger | |
| 4,007,688 A | 2/1977 | Franz | |
| 4,085,584 A * | 4/1978 | Jones et al. | 60/250 |
| 4,345,427 A | 8/1982 | Whitesides, Jr. | |
| 4,357,795 A | 11/1982 | Bastian et al. | |
| 4,505,180 A | 3/1985 | Hinrichs | |
| 4,539,910 A | 9/1985 | Stevens | |
| 4,936,092 A * | 6/1990 | Andrew | 60/245 |
| 4,972,673 A | 11/1990 | Carrier et al. | |
| 5,024,160 A | 6/1991 | Canterberry et al. | |
| 5,062,593 A | 11/1991 | Goddard | |
| 5,160,070 A | 11/1992 | Hibler | |
| 5,440,993 A | 8/1995 | Osofsky | |
| 5,456,425 A | 10/1995 | Morris | |
| 5,600,946 A * | 2/1997 | Dombrowski et al. | 60/253 |
| 5,608,183 A | 3/1997 | Barnes et al. | |
| 5,613,358 A | 3/1997 | Humiston | |
| 5,647,558 A | 7/1997 | Linick | |
| 5,675,966 A | 10/1997 | Dombrowski et al. | |
| 5,755,401 A * | 5/1998 | Frey et al. | 244/3.22 |
| 5,765,367 A | 6/1998 | Denoel | |
| 6,045,638 A | 4/2000 | Lundstrom | |
| 6,202,037 B1 | 3/2001 | Hattori et al. | |
| 6,352,030 B1 | 3/2002 | Doll et al. | |
| 6,357,357 B1 | 3/2002 | Glasser | |
| 6,598,901 B2 * | 7/2003 | Nakashima et al. | 280/736 |
| 6,705,076 B1 * | 3/2004 | Sowa | 60/258 |
| 6,745,696 B1 | 6/2004 | Rotkopf | |
| 6,895,991 B2 | 5/2005 | Woessner | |
| 6,968,676 B1 | 11/2005 | Krishnan | |
| 7,000,377 B1 | 2/2006 | Knight | |
| 7,022,196 B2 | 4/2006 | Cesaroni et al. | |
| 7,194,852 B1 | 3/2007 | Krishnan | |
| 7,258,936 B2 | 8/2007 | Zheng et al. | |
| 7,281,367 B2 * | 10/2007 | Rohrbaugh et al. | 60/253 |
| 7,685,940 B1 | 3/2010 | Cavalleri et al. | |
| 7,886,519 B2 | 2/2011 | Woessner et al. | |
| 7,947,938 B2 | 5/2011 | Dryer | |
| 8,015,920 B1 | 9/2011 | Wilkinson et al. | |
| 2002/0157557 A1 | 10/2002 | Cesaroni et al. | |
| 2002/0195181 A1 | 12/2002 | Lundstrom et al. | |
| 2004/0244890 A1 | 12/2004 | Cesaroni et al. | |
| 2007/0044450 A1 | 3/2007 | Kuninaka | |
| 2008/0216462 A1 | 9/2008 | Woessner et al. | |

* cited by examiner

PELLET-LOADED MULTIPLE IMPULSE ROCKET MOTOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to solid fuel rocket motors, and to fast response motors suitable for use as attitude control thrusters.

2. Description of the Related Art

Solid fuel rocket motors are commonly used in various configurations to propel rockets and missiles. Small solid fuel rocket motors may also be used to control the attitude and steering of a missile, rocket, or other projectile. Small solid fuel rocket motors used to control attitude are commonly called attitude thrusters or divert thrusters. Solid fuel rocket motors may also be used to turn a vertically-launched missile or rocket into near-horizontal flight. Such rocket motors are commonly called pitch-over thrusters.

The thrust or force produced by a rocket motor is given by the equation $$F = m_p * U_e + (P_e - P_a) * A_e$$

where
  $m_p$ = propellant mass flow rate, and
  $P_e$ = Nozzle exit pressure
  $P_a$ = Ambient pressure
  $A_e$ = Nozzle exit area
  $U_e$ = gas velocity at nozzle exit plane.

When a rocket motor includes an ideally expanded nozzle, $P_e = P_a$, and the equation for the thrust produced by the rocket motor reduces to $$F = m_p * U_e.$$

The propellant mass flow rate $m_p$ is given by the equation $$m_p = A_p * R_b * P_p$$

where
  $A_p$ = propellant surface area,
  $R_b$ = propellant burn rate, and
  $P_p$ = propellant density.

Thus the propellant surface area $A_p$, the propellant burn rate $R_b$ and the propellant density $P_p$ are important factors that may be used to determine the thrust produced by a solid fuel rocket.

The force produced by a rocket motor results in a linear or angular acceleration of the missile or other body propelled by the rocket motor. The net change in the linear or angular velocity of the missile or other body is proportional to the force produced by the motor integrated over time. The time integral of the force produced by a rocket motor is commonly called the "impulse" of the motor.

Divert thrusters and other solid fuel rocket motors may provide a single impulse or may be configured to provide multiple impulses by consecutively burning multiple propellant charges. A typical multiple-impulse rocket motor, such as that shown in U.S. Pat. No. 5,160,070 for example, may include a plurality of propellant charges arranged in sequence in a common case. Each of the plurality of propellant charges may have a separate igniter. Each of the plurality of propellant charges may be separated from the adjacent propellant charges by a burst disk or other barrier. The plurality of propellant charges may be ignited in sequence starting with the propellant charge disposed adjacent to a nozzle.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
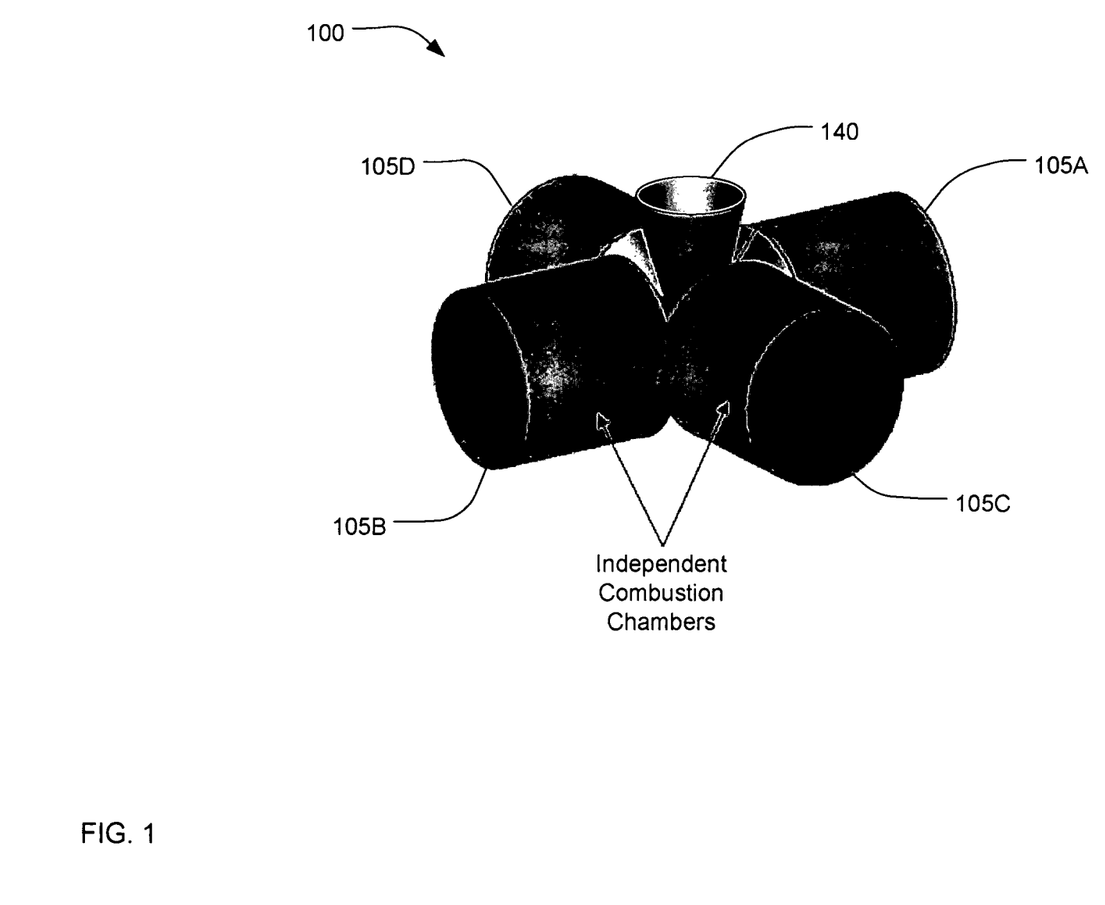
FIG. 1 is a perspective view of an exemplary pellet-loaded multiple-impulse solid fuel rocket motor.

Referring now to FIG. 1, a pellet-loaded multiple-impulse rocket motor 100 may include a plurality of independent combustion chambers 105A, 105B, 105C, 105D, which share a common nozzle 140. Each of the combustion chambers 105A-D may include a propellant charge within a case coupled to the common nozzle 140. Each of the combustion chambers 105A-D may be ignited independently and may burn without igniting or otherwise impacting the other combustion chambers. While the example of FIG. 1 shows four combustion chambers 105A-D, there may be two, three, six, eight, or some other number of combustion chambers sharing the common nozzle 140.

Each of the plurality of combustion chambers 105A-D may be separately and directly coupled to the common nozzle 140, such that a direct path is provided for combustion gases from each of the combustion chambers to the common nozzle 140 without flowing through any other of the combustion chambers. The plurality of combustion chambers 105A-D may be disposed radially about the common nozzle 140, as shown in FIG. 1, or may be disposed in some other manner. In this context, the term radially means to radiate outward but does not imply equal angular separation between adjacent combustion chambers. The plurality of combustion chambers 105A-D may be the same size, as shown in FIG. 1, or may be of different sizes.

Figure 2:
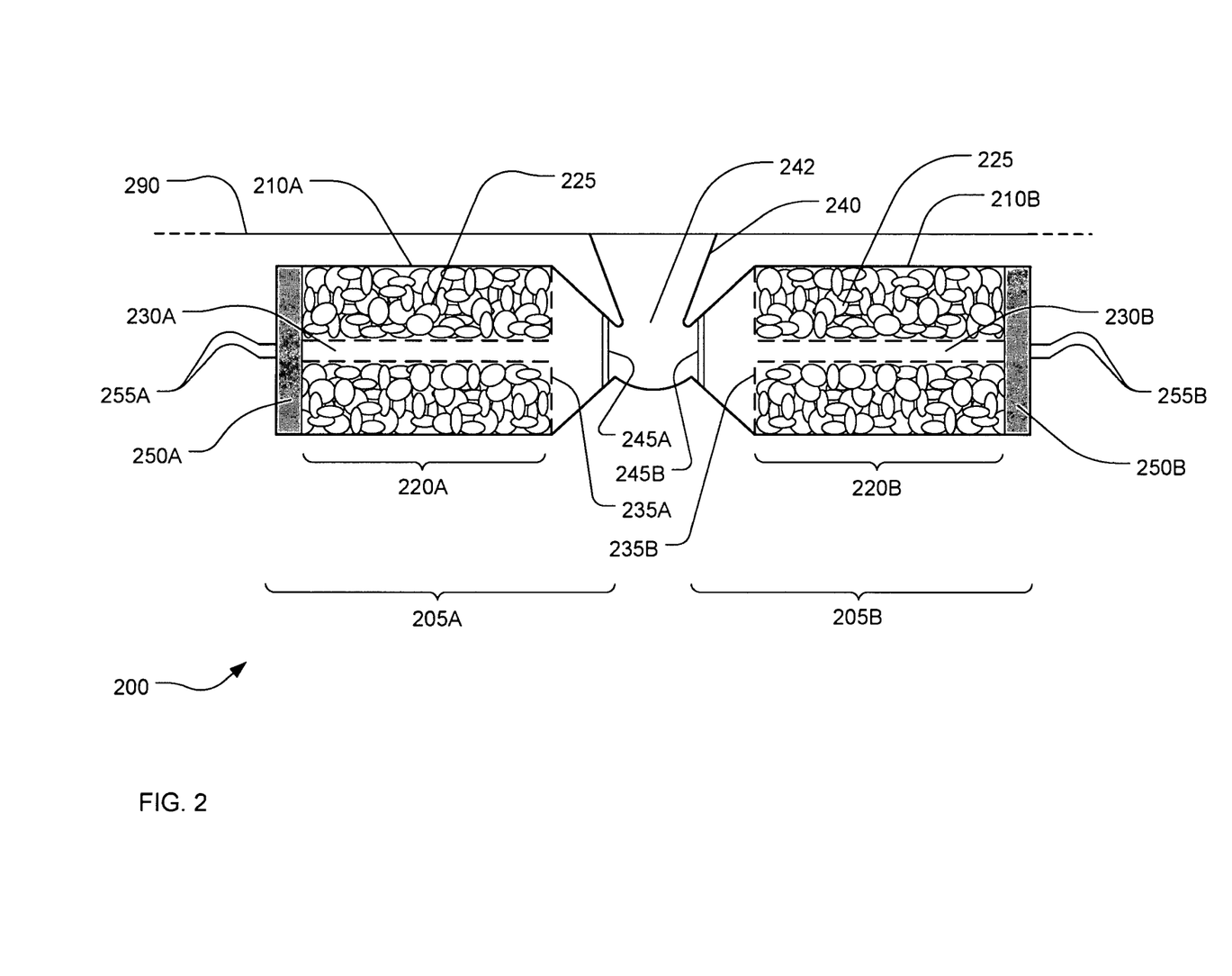
FIG. 2 is a cross-sectional view of an exemplary pellet-loaded multiple-impulse solid fuel rocket motor.

FIG. 2 shows a cross-sectional view through two combustion chambers 205A, 205B of a pellet-loaded multiple-impulse rocket motor 200. The combustion chambers 205A, 205B may be the combustion chambers 105A, 105B of the pellet-loaded multiple-impulse rocket motor 100 shown in FIG. 1. Each combustion chamber 205A, 205B may include a respective case 210A, 210B, a respective solid fuel propellant charge 220A, 220B, and a respective igniter 250A, 250B. The cases 210A, 210B may be coupled to a common nozzle 240.

In FIG. 1, the cases 210A, 210B and the nozzle 240 are represented by a continuous boundary. However, the cases 210A, 210B and the nozzle 240 may be three or more physically separable components that may be joined, for example, at mating threaded interfaces (not shown) or by welding or another attachment process.

When the pellet-loaded multiple-impulse rocket motor 200 is used as a divert thruster or control motor for a missile having a generally cylindrical body, the combustion chambers 205A, 205B may be disposed generally parallel to an exterior wall 290 of the missile body. The nozzle 240 may be adapted to discharge that the exhaust gases from the pellet-loaded multiple-impulse rocket motor 200 through the side wall 290 of the missile. The nozzle 240 may be adapted to discharge the exhaust gases from the pellet-loaded multiple-impulse rocket motor 200 through the side wall 290 in a direction approximately normal to the sidewall 290.

The igniters 250A, 250B may be a small charge of flammable material that, when ignited, releases a predetermined amount of hot combustion gases. The combustion of the igniter may be initiated, for example, by an electric current flowing through a heater wire adjacent to, or embedded in, the flammable igniter material. In order to ignite one of the propellant charges 220A or 220B, it may be necessary for the temperature and pressure of the gases produced by the respective igniter 250A or 250B to both exceed predetermined values.

Prior to ignition of each igniter 250A, 250B and the respective propellant charges 220A, 220B, the coupling between each combustion chamber 205A, 205B and the nozzle 240 may be sealed by respective burst disks 245A, 245B. In this context, the term "burst disk" means any structure that isolates one of the combustion chambers 205A, 205B from the nozzle 240 until the propellant charge within the combustion chamber is ignited, at which time the pressure within the combustion chamber causes the disk to burst or otherwise open.

Upon ignition of one igniter, for example the igniter 250A, the respective burst disk may be effective to allow pressure to build within the combustion chamber 205A, and thus facilitate ignition of the propellant charge 220A. The burst disk 245A may be designed to rupture, blow free from the motor, or otherwise open a passage from the combustion chamber to the nozzle after the pressure within the combustion chamber 205A exceeds a predetermined pressure level, which may be, for example, between 100 and 2000 pounds per square inch (PSI). For example, the burst disk 245A may be retained in the nozzle by means of shear pins that fracture when the pressure exceeds the predetermined level. The burst disk 245A may have a controlled structural weakness that allows the burst disk to rupture in a controlled manner when the pressure exceeds the predetermined level.

The burst disks 245A, 245B may also serve to protect the solid fuel propellant charges 220A, 220B from environmental effects, such as humidity and precipitation.

Once the burst disk 245A ruptures, exhaust gases from combustion of the corresponding igniter 205A and propellant charge 220A may discharge through the nozzle 240. The nozzle 240 and the burst disks 245A, 245B may be adapted such that, when a single combustion chamber is ignited (for example combustion chamber 205A), the burst disks (such as burst disk 245B) within the other combustions chambers remain intact and prevent sympathetic ignition of the other combustion chambers. Each of the burst disks 245A, 245B may be, for example, a frangible disk supported by a back-up member disposed on the side of the disk facing away from the nozzle, similar to the burst disks described in U.S. Pat. No. 4,505,180. The combination of the frangible disk and back-up member may allow the burst disk 245A, 245B to withstand high pressure in the nozzle while rupturing at relatively low pressure when the propellant charge in the associated combustion chamber is ignited. Thus each of the combustion chambers 205A, 205B of the pellet-loaded multiple-impulse rocket motor 200 may be ignited independently.

To reduce the time required to ignite one of the propellant charges 220A, 220B, the interior of each combustion chamber 205A, 205B may be pressurized with air or another gas to an initial pressure level during manufacture. For example, the initial pressure in the cavity prior to ignition may be 500 to 2000 PSI. In this case, each burst disk 245A, 244B may be designed to retain the initial pressure level indefinitely and to rupture at a substantially higher pressure level after the respective propellant charge 220A, 220B is ignited.

Each propellant charge 220A, 220B may include a large plurality (dozens, hundreds, or thousands) of solid fuel pellets 225 which together constitute the solid propellant charge 220A, 220B. The solid fuel pellets 225 may be, for example, gas generator pellets that are produced in large quantities for use in automobile air bags.

Figure 3:
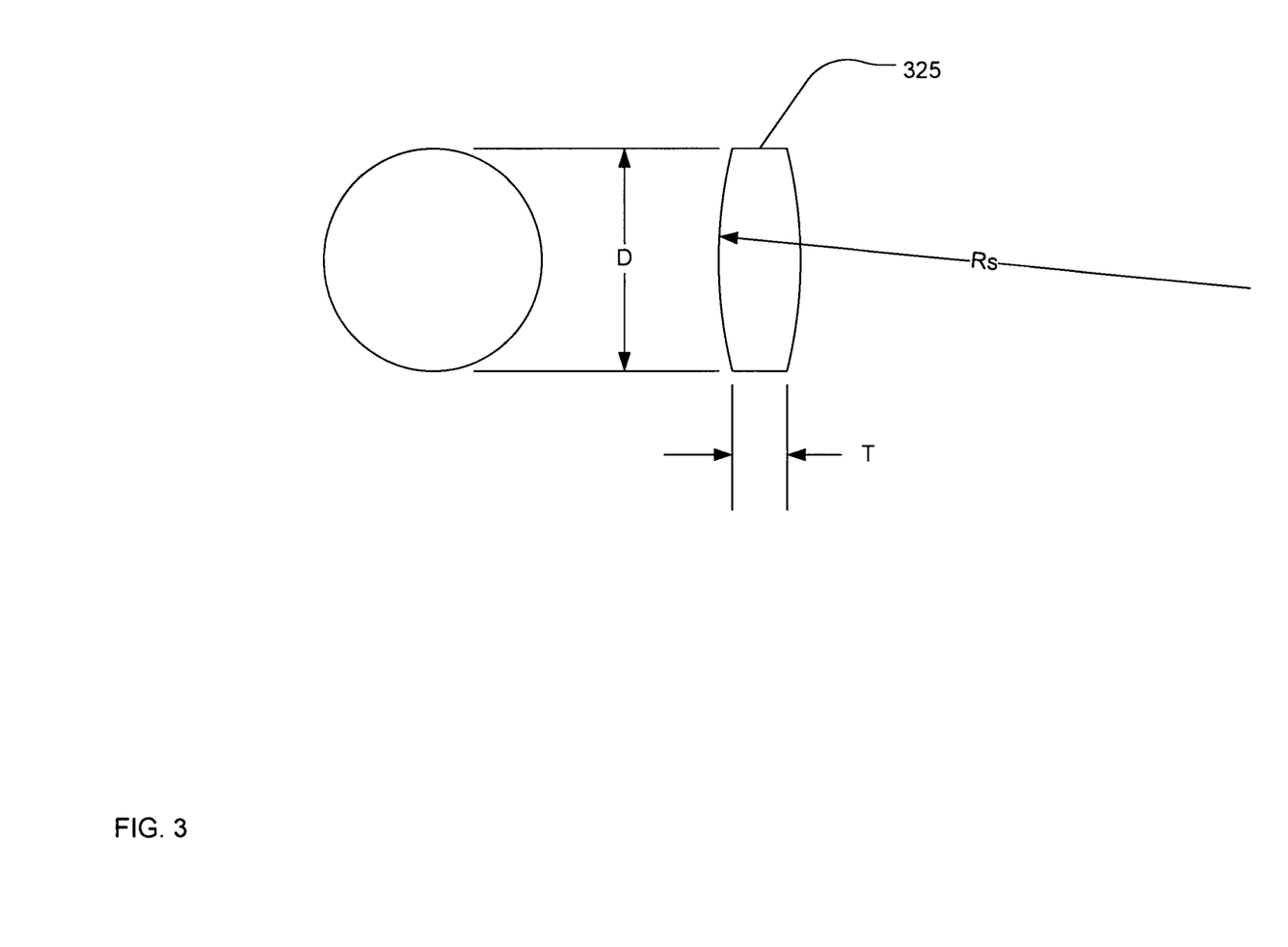
FIG. 3 is an outline drawing of a fuel pellet.

Referring now to FIG. 3, an exemplary solid fuel pellet 325 may be formed in a shape similar to that of a medicine tablet such as an aspirin. Each solid fuel pellet 325 may have a diameter D and a thickness T. One or both faces of the solid fuel pellet 325 may be convex with a radius Rs. The convex faces may minimize the contact area between adjacent solid fuel pellets and thus prevent the pellets from stacking or agglomerating. The convex faces may thus ensure that a plurality of pellets such as solid fuel pellet 325 will have a very large total burnable surface area. Each fuel pellet may be formed in other shapes including flat disks, spheres, elongated cylinders, elongated cylinders with rounded ends, and other shapes.

Each solid fuel pellet 325 may be composed of at least some of an energetic fuel material and an oxidizer material. Each fuel pellet may contain additional binder and/or plasticizer material. The binder material and the plasticizer material may be reactive and may serve as a fuel material and/or an oxidizer material. Suitable compositions for gas generator solid fuel pellets are well known. Suitable gas generator compositions include, for example, compositions that are predominantly guanidine (or guanidinium) nitrate and basic copper nitrate, cobalt nitrate, and combinations thereof, as described in U.S. Pat. No. 5,608,183. At least 60% of the total mass of the fuel pellets may be composed of guanidine nitrate and basic copper nitrate. The solid fuel pellets may have relatively low combustion temperatures, for example between 1500° C. and 2000° C., such that components of the rocket motor that are exposed to the combustion products may be fabricated from molybdenum or TZM (titanium-zirconium-molybdenum) alloy.

Referring back to FIG. 2, the solid fuel pellets 225 may be randomly disposed with the rocket motor as shown. Alternatively the solid fuel pellets 225 may be arranged or stacked in an ordered manner. To facilitate arranging or stacking fuel pellets in an orderly manner, each combustion chamber 205A, 205B may include rods, guides, or other structure (not shown in FIG. 2) to position the and retain the stacked pellets.

The solid fuel pellets 225 may all be identical or may be a mixture of two or more pellet compositions or sizes. Some or all of the solid fuel pellets may be coated with an inhibitor to change the burning characteristics of the fuel pellets. The inhibitor may be a non-burning or slowly burning organic, inorganic, or composite material that delays the ignition of the coated pellets and thus prolongs the burning time of the rocket motor. The inhibitor coating may be applied by painting, spraying, dipping or bonding. The thrust versus time profile of the rocket motor may be tailored by combining multiple fuel pellet sizes, compositions, and/or inhibitor coatings.

The solid fuel pellets 225 may be retained within the combustion chambers 205A, 205B by perforated pellet retainers 235A, 235B. The term "perforated" intended to encompass any type or shape of openings in the structure of the pellet retainer, and does not imply any particular method of forming or creating the openings. The pellet retainers 235A, 235B may, as shown in this example, extend along the length of the combustion chambers 205A, 205B. The pellet retainers 235A, 235B may define cavities 230A, 230B that may be devoid of fuel pellets. The cavities 230A, 230B may be generally cylindrical, as shown in FIG. 2, or some other shape. The cavities 230A, 230B may provide a direct passage for the hot combustion gasses from the burning fuel pellets to the nozzle 240. The cavities 230A, 230B may provide a direct passage for at least a portion of the hot combustion gasses from the igniters 250A, 250B to the fuel pellets 225.

The pellet retainers 235A, 235B may be a uniform diameter cylinder, a tapered cylinder or conical shape, or some other shape. The pellet retainer may have an irregular cross-section, particularly, in situations where the combustion chamber cases 210A, 210B are not cylindrical. The pellet retainers 235A, 235B may be formed of a thin metal material with machined or chemically formed perforations. The pellet retainers 235A, 235B may be formed of a woven or etched screen or mesh. The retainers 235A, 235B may be formed as a single physical element, or may include a plurality of physical pieces such as, for example, a plurality of closely spaced metal disks, wires, or rods. However, the pellet retainers are formed, the perforations in the pellet retainers 235A, 235B may be circular, square, rectangular, or elongated slits, or any other shape that allows passage for the combustion gases while retaining the fuel pellets.

The dimensions of the perforations or openings in the pellet retainers 235A, 235B may be significantly smaller than at least one dimension of the fuel pellets 225, such that the fuel pellets may not pass through the pellet retainer until combustion is nearly complete. When combustion of the fuel pellets 225 is nearly complete, at least some of the fuel pellets may be swept through the perforations in the pellet retainers 235A, 235B into the respective cavity 230A, 230B by the flow of the combustion gases. The size of the perforations in the pellet retainers 235A, 235B, relative to the size of the pellets 225, may be such that at least a portion of the fuel pellets passing through the pellet retainer are completely burned before the fuel pellets pass through a throat 242, which may be the portion of the nozzle 240 having the smallest cross-sectional area. Fuel pellets that are completely burned within cavities 230A, 230B before passing through the throat 242 may fully contribute to the thrust of the rocket motor. Each fuel pellet that is still burning as it is ejected through the throat 242 may result in an incremental reduction in the total thrust provided by the rocket motor.

The combustion of the propellant charges 200A, 220B may be controlled, to some extent, by controlling the pressure within the combustion chambers 205A, 205B. The pressure within the combustion chambers may be determined, at least in part, by the cross sectional area of an aperture that restricts the flow of combustion gases from the propellant charges 220A, 220B to the outlet of the nozzle 240. The cross-sectional area of the throat 242 may be selected to control the pressure within each combustion chamber 205A, 205B during combustion. In this case, the total cross-sectional area of the perforations in each of the pellet retainers 235A, 235B may be larger than the cross-section area of the throat 242.

The perforations in the pellet retainers 235A, 235B may be used to control, at least in part, the pressure at the propellant charges 220A, 220B by restricting the flow of combustion gases from the burning fuel pellets 225 to the nozzle 240. The size and distribution of the perforations in the pellet retainers 235A, 235B may be used to control the flow of combustion gases and the pressure gradients within each combustion chamber 205A, 205B. In this case, the total cross-sectional area of the perforations in each of the pellet retainers 235A, 235B may be comparable to or smaller than the cross-section area of the throat 242.

The cases 210A, 210B, the nozzle 240, and the pellet retainers 235A, 235B may be fabricated of a ceramic material, a metal material such as molybdenum or TZM alloy, or another material. The cases 210A, 210B, the nozzle 240, and the pellet retainers 235A, 235B may be fabricated primarily of a material, such as a steel or reinforced composite material, that cannot directly withstand the combustion temperatures of the fuel pellets if suitable thermal insulating layers are provided. The cases 210A, 210B, the nozzle 240, and the pellet retainers 235A, 235B may be fabricated primarily of a material, such as a steel or reinforced composite material, that cannot directly withstand the combustion temperatures of the fuel pellets if the various elements are thick enough to retain physical integrity for the duration of the rocket motor burn in spite of erosion or other degrading effects of the combustion gases.

Figure 4:
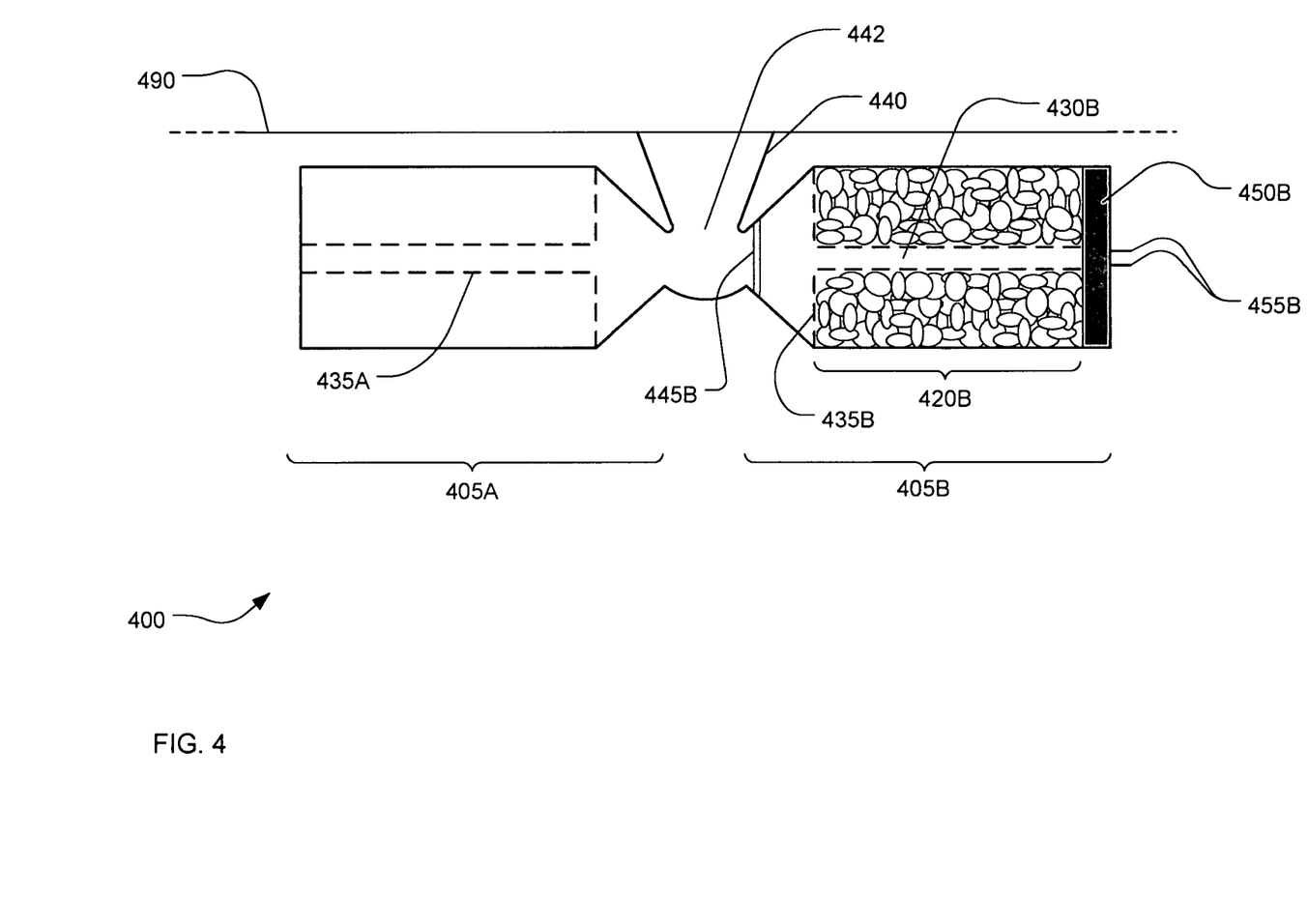
FIG. 4 is a cross-sectional view of an exemplary pellet-loaded multiple-impulse solid fuel rocket motor.

FIG. 4 shows a cross-sectional view through first and second combustion chambers 405A, 405B of a pellet-loaded multiple-impulse rocket motor 400, which may be the combustion chambers 105A, 105B of the pellet-loaded multiple-impulse rocket motor 100 shown in FIG. 1. As shown in FIG. 4, the first combustion chamber 405A is, for the most part, empty because a propellant charge (not visible in FIG. 4) in the first combustion chamber 405A was previously ignited and burned.

During the combustion of the fuel in the first combustion chamber 405A, a burst disk 445B within the second combustion chamber 405B may have prevented ignition of the propellant charge 420B within the second combustion chamber 405B. As shown in FIG. 4, the propellant charge 420B has not yet been ignited.

When the propellant charge 420B is ignited by an igniter 450B, combustion gases from the combustion of the igniter 450B and the propellant charge 420B will cause the pressure within the second combustion chamber 405B to build. When the pressure within the second combustion chamber reaches a predetermined level, the burst disk 454B may rupture or blow free, opening a passage from the second combustion chamber 405B to the nozzle 440. Once the passage is open, most of the combustion gases may discharge directly through the nozzle 440. However, a portion of the combustion gases may flow into the empty first combustion chamber 405A, at least until the pressure within the first combustion chamber is equalized with the pressure at a throat 442 within the nozzle 440. The combustion gases that flow into the empty first combustion chamber 405A may not contribute to the impulse produced by the ignition and combustion of the propellant charge 420B.

Thus, if the propellant charges within the first and second combustion chambers 405A, 405B contained the same quantity of propellant material, the combustion chamber ignited first may provide a higher impulse than that provided by the combustion chamber ignited second.

If the first and second combustion chambers 405A, 405B are to be ignited in order and are intended to provide the same impulse, the second combustion chamber 405B may have an incrementally larger propellant charge than the first combustion chamber 405A. Specifically, the propellant charge 420B in the second combustion chamber 405B may be larger than the propellant charge (not visible) of combustion chamber 405A by the amount of propellant material necessary to provide gas to pressurize the first combustion chamber 405A. Similarly, if a third combustion chamber (not visible in FIG. 4) is also intended to provide the same impulse, the propellant charge in the third combustion chamber must be incrementally larger than the propellant charge 420B, since portions of the combustion gases produced by the third combustion chamber may be diverted from the nozzle to pressurize both the first and second combustion chambers. In general, a plurality of combustion chambers, such as the combustion chambers 105A-D of FIG. 1, may each provide the same impulse if the chambers are ignited in a predetermined sequence, and if each combustion chamber in the sequence has an incrementally larger propellant charge than the previous combustion chamber in the sequence.

Figure 5A:
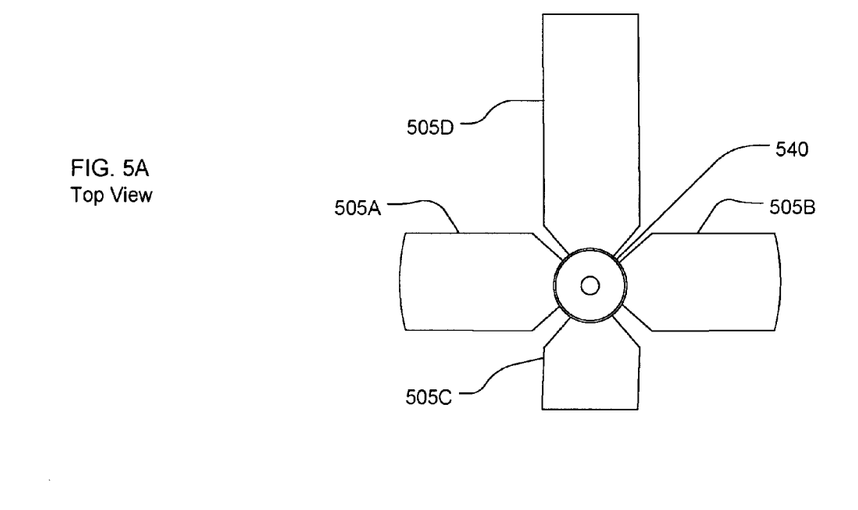
FIG. 5A is a top view of an exemplary pellet-loaded multiple-impulse solid fuel rocket motor.
Figure 5B:
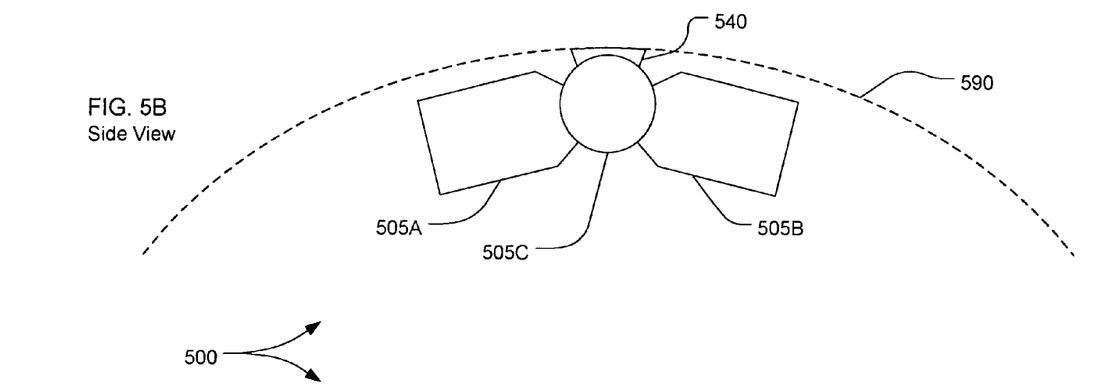
FIG. 5B is a side view of the exemplary pellet-loaded multiple-impulse solid fuel rocket motor of FIG. 5A.

FIG. 5A and FIG. 5B show top and side views, respectively, of an exemplary pellet-loaded multiple-impulse rocket motor 500 that includes a plurality of independent combustion chambers 505A, 505B, 505C, 505D which share a common nozzle 540. Each of the combustion chambers 505A-D may include a propellant charge within a case coupled to the common nozzle 540. Each of the combustion chambers 505A-D may be ignited independently and may burn without igniting or otherwise impacting the other combustion chambers.

In the example of FIG. 5, the combustion chambers 505A and 505B may be of a first size. Each of the combustion chambers 505A and 505B may hold a propellant that, when ignited, provides a first impulse value. The combustion chambers 505C and 505D may be, respectively, smaller and larger than the first size. The combustion chambers 505C and 505D may, when ignited, provide an impulse that is smaller and greater than the first impulse value, respectively. For example, the combustion chamber 505C may provide an impulse that is 0.5 times the first impulse value, and the combustion chamber 505D may provide an impulse that is 2.0 times the first impulse value. By selective ignition of one or more of the combustion chambers 505A-D concurrently or in sequence, a total impulse of 0.5, 1.0, 1.5, 2.0, 2.5, 3.0, 3.5, 4.0, and 4.5 times the first impulse value may be provided. Other sizes and combinations are possible. In general, having non-equal propellant charges in at least some of the plurality of combustion chambers may allow finer control of the total impulse provided by the multiple-impulse rocket motor 500.

Figure 6A:
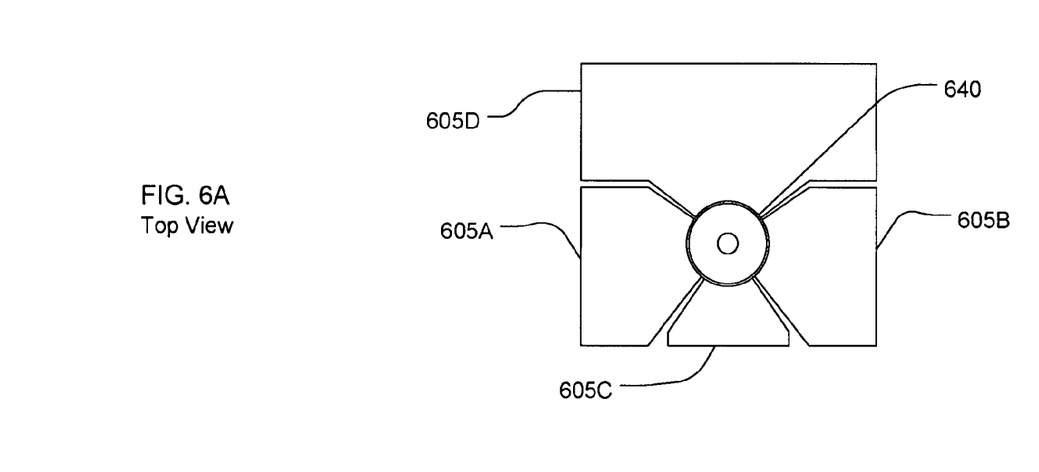
FIG. 6A is a top view of an exemplary pellet-loaded multiple-impulse solid fuel rocket motor.
Figure 6B:
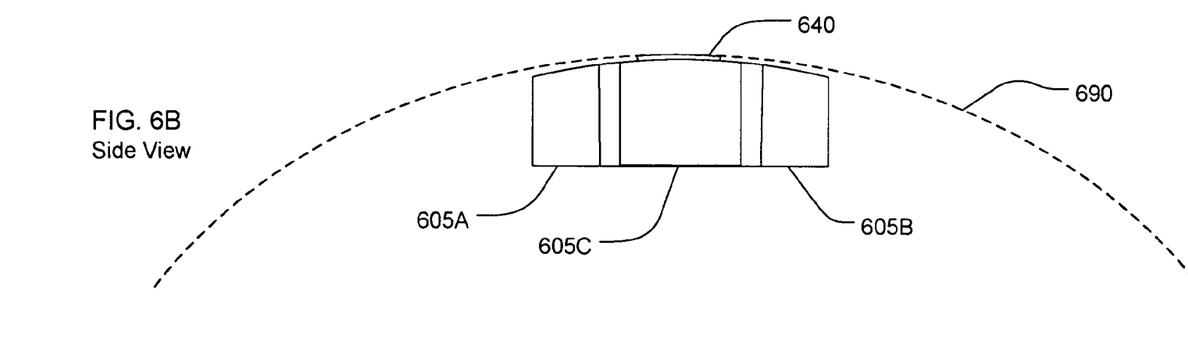
FIG. 6B is a side view of the exemplary pellet-loaded multiple-impulse solid fuel rocket motor of FIG. 6A.

FIG. 6A and FIG. 6B show top and side views, respectively, of an exemplary pellet-loaded multiple-impulse rocket motor 600 that includes a plurality of independent combustion chambers 605A, 605B, 605C, 605D which share a common nozzle 640. Each of the combustion chambers 605A-D may include a propellant charge within a case coupled to the common nozzle 640. Each of the combustion chambers 605A-D may be ignited independently and may burn without igniting or otherwise impacting the other combustion chambers.

The exemplary multiple-impulse rocket motor 600 may be similar to the multiple-impulse rocker motor 500 in that the plurality of independent combustion chambers 605A-D may be of several different sizes and may provide corresponding different impulse values. In contrast to the previously described rocket motors 100, 200, 400, and 500, the plurality of independent combustion chambers 605A-D are not generally cylindrical in shape. Since the propellant charge within each of the plurality of independent combustion chambers 605A-D may be a plurality of solid fuel pellets, the shape and form factor of the combustion chambers 605A-D may be arbitrary. The shape and form factor of the combustion chambers 605A-D may be designed to minimize the overall volume occupied by the multiple-impulse rocket motor 600. The shape and form factor of the combustion chambers 605A-D may be designed to occupy an irregularly-shaped available volume within a missile. In particular, as shown in FIG. 6, at least a portion of the case of some or all of the combustion chambers 605A-D may be adapted to be conformal to an exterior wall 690 of a missile.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A rocket motor, comprising:
a nozzle having a variable cross-sectional area, with a throat of the nozzle being at a smallest cross-sectional area;

a plurality of combustion chambers directly coupled to the nozzle, each of the plurality of combustion chambers comprising:
a case, with different of the combustion chambers having different cases;
a propellant charge comprising a plurality of fuel pellets disposed within the case;
an igniter disposed to ignite the propellant charge;
a pellet retainer disposed to retain unignited fuel pellets within the case and having a plurality of perforations therein, with different of the chambers having different pellet retainers; and
a burst disk disposed between the propellant charge and the nozzle, the burst disk adapted to rupture when the propellant charge is ignited and to not rupture when a propellant charge of any of the other combustion chambers is ignited;
wherein for each of the plurality of combustion chambers the burst disk associated with the combustion chamber is operatively coupled to the propellant charge associated with the combustion chamber, such that ignition of the propellant charge causes the burst disk to rupture when pressure within the combustion chamber exceeds a predetermined pressure level;
wherein the plurality of combustion chambers includes at least three combustion chambers; and
wherein the propellant charges may be selectively ignited in different ways, with different individual of the propellant charges ignited individually, or different combinations of the propellant charges simultaneously or in sequence.

2. The rocket motor of claim 1, wherein the plurality of combustion chambers are disposed radially about the nozzle.

3. The rocket motor of claim 2, wherein there is equal angular separation between each of the plurality of combustion chambers.

4. The rocket motor of claim 1, wherein the plurality of combustion chambers are adapted to produce the same impulse.

5. The rocket motor of claim 1, wherein the plurality of combustion chambers are adapted to be ignited in a sequence from a first combustion chamber to a last combustion chamber, each combustion chamber in the sequence having an incrementally larger propellant charge than the previous combustion chamber in the sequence.

6. The rocket motor of claim 1, wherein the propellant charge within one of the combustion chambers is larger than the propellant charge in another of the combustion chambers.

7. The rocket motor of claim 1, wherein, within each of the plurality of combustion chambers, the plurality of fuel pellets are disposed randomly within a portion of the case defined by the pellet retainer.

8. The rocket motor of claim 1, wherein, within each of the plurality of combustion chambers, the pellet retainer defines a cavity devoid of fuel pellets, the cavity adapted to conduct exhaust gases from the plurality of fuel pellets to the nozzle.

9. The rocket motor of claim 1, wherein, within each of the plurality of combustion chambers, a total area of the plurality of perforations in the pellet retainer is greater than a cross-sectional area of a throat within the nozzle.

10. The rocket motor of claim 1, wherein the fuel pellets have a combustion temperature below 2000° C.

11. The rocket motor of claim 1, wherein at least 60% of the mass of the fuel pellets is guanidine nitrate and basic copper nitrate.

12. The rocket motor of claim 1, wherein the pellet retainer is fabricated, at least in part, from one of molybdenum or TZM alloy.

13. The rocket motor of claim 1, further comprising:
an exterior wall defining a generally cylindrical missile body
wherein the apparatus is disposed within the missile body and the nozzle provides a passage for exhaust gases to be discharged through the exterior wall.

14. The rocket motor of claim 13, wherein the nozzle is adapted to discharge exhaust gases in a direction generally normal to the exterior wall.

15. The rocket motor of claim 13, wherein at least a portion of the case of at least one of the plurality of combustion chambers is conformal to the exterior wall.

16. The rocket motor of claim 15, wherein at least a portion of the case of each of the plurality of combustion chambers is conformal to the exterior wall.

17. The rocket motor of claim 1, wherein the plurality of perforations are a plurality of openings in a structure of the perforated pellet retainer.

18. The rocket motor of claim 1, wherein the perforations are smaller in at least one dimension than the fuel pellets.

19. The rocket motor of claim 1,
wherein the propellant charges have respective impulse values;
wherein the propellant charges include propellant charges with at least two different impulse values.

20. The rocket motor of claim 19, wherein the propellant charges include propellant charges with at least three different impulse values.

21. The rocket motor of claim 19, where one of the impulse values is at least twice another of the impulse values.

22. The rocket motor of claim 1,
wherein the propellant charges have respective impulse values;
wherein the propellant charges include propellant charges with the same impulse value, with the propellant charges with the same impulse value able to be ignited simultaneously.

23. A rocket motor, comprising
a nozzle having a variable cross-sectional area, with a throat of the nozzle being at a smallest cross-sectional area;
a plurality of combustion chambers directly coupled to the nozzle, each of the plurality of combustion chambers comprising:
a case, with different of the combustion chambers having different cases;
a propellant charge comprising a plurality of fuel pellets disposed within the case;
an igniter disposed to ignite the propellant charge;
a pellet retainer disposed to retain unignited fuel pellets within the case and having a plurality of perforations therein, with different of the chambers having different pellet retainers; and
a burst disk disposed between the propellant charge and the nozzle, the burst disk adapted to rupture when the propellant charge is ignited and to not rupture when a propellant charge of any of the other combustion chambers is ignited;
wherein the propellant charge within one of the combustion chambers is larger than the propellant charge in another of the combustion chambers, to provide different impulse values when the propellant charges are ignited;

wherein for each of the plurality of combustion chambers the burst disk associated with the combustion chamber is operatively coupled to the propellant charge associated with the combustion chamber, such that ignition of the propellant charge causes the burst disk to rupture when pressure within the combustion chamber exceeds a predetermined pressure level;

wherein the plurality of combustion chambers includes at least three combustion chambers; and wherein the propellant charges may be selectively ignited in different ways, with different individual of the propellant charges ignited individually, or different combinations of the propellant charges simultaneously or in sequence.

24. The rocket motor of claim 23, wherein the propellant charges include propellant charges with at least three different impulse values.

25. The rocket motor of claim 23, where one of the impulse values is at least twice another of the impulse values.

26. An apparatus, comprising
- a nozzle having a variable cross-sectional area, with a throat of the nozzle being at a smallest cross-sectional area;
- a plurality of combustion chambers directly coupled to the nozzle, each of the plurality of combustion chambers comprising:
- a case, with different of the combustion chambers having different cases;
- a propellant charge comprising a plurality of fuel pellets disposed within the case;
- an igniter disposed to ignite the propellant charge;
- a pellet retainer disposed to retain unignited fuel pellets within the case and having a plurality of perforations therein, with different of the chambers having different pellet retainers; and
- a burst disk disposed between the propellant charge and the nozzle, the burst disk adapted to rupture when the propellant charge is ignited and to not rupture when a propellant charge of any of the other combustion chambers is ignited;

wherein the propellant charge within one of the combustion chambers is larger than the propellant charge in another of the combustion chambers;

wherein a first propellant charge within a first combustion chamber of the plurality of combustion chambers is larger than a second propellant charge within a second combustion chamber of the plurality of combustion chambers;

wherein a third propellant charge within a third combustion chamber is larger than the second propellant charge;

wherein a first combustion chamber of the plurality of combustion chambers is larger than a second combustion chamber of the plurality of combustion chambers; and wherein a third combustion chamber is larger than the second combustion chamber.

* * * * *